United States Patent [19]

Lange et al.

[11] 3,946,277

[45] Mar. 23, 1976

[54] ZERO CURRENT SWITCHING CIRCUITRY

[76] Inventors: George M. Lange, 10220 Edgewood Drive, Sun City, Ariz. 85351; Walter C. Pierce, 5712 Chapmin Ave., Alexandria, Va. 22303

[22] Filed: Aug. 28, 1974

[21] Appl. No.: 501,399

[52] U.S. Cl................. 317/11 A; 307/133; 307/136

[51] Int. Cl.²...................... H01H 33/59; H02H 3/00

[58] Field of Search................ 317/11 R, 11 A, 9 C; 307/133, 136

[56] References Cited

UNITED STATES PATENTS

| | | | |
|---|---|---|---|
| 3,265,933 | 8/1966 | Perry et al. | 317/11 A |
| 3,457,432 | 7/1969 | Korn | 317/11 A |
| 3,702,941 | 11/1972 | Aiduck et al. | 317/11 A |

*Primary Examiner*—Gerald Goldberg

*Attorney, Agent, or Firm*—Nathan Edelberg; Robert P. Gibson; Glenn S. Ovrevik

[57] ABSTRACT

Circuitry for providing the opening of circuit breaker contacts at a zero load current crossing is disclosed. A sensing circuit senses the phase relationship of the load current with respect to time and provides a square wave voltage in phase with the load current. This square wave voltage is phase shifted and this phase shifted signal is used to control the opening of the circuit breaker contacts at a zero load current crossing point.

2 Claims, 1 Drawing Figure

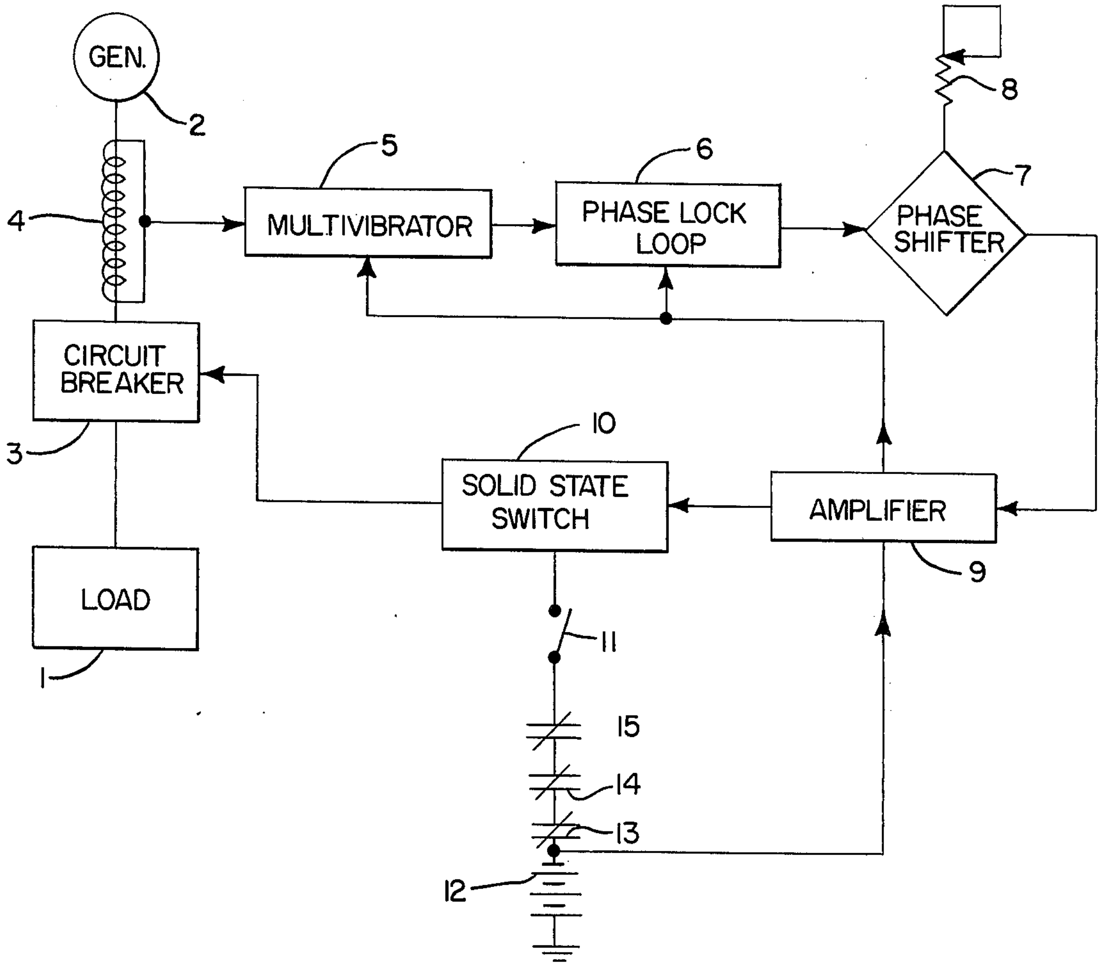
GEN.
2
4
5
MULTIVIBRATOR
6
PHASE LOCK LOOP
8
7
PHASE SHIFTER
CIRCUIT BREAKER
3
10
SOLID STATE SWITCH
AMPLIFIER
9
LOAD
1
11
15
14
13
12

ZERO CURRENT SWITCHING CIRCUITRY

The invention described herein may be manufactured, used, and licensed by or for the Government for Governmental purposes without the payment to me of any royalties thereon.

BACKGROUND OF THE INVENTION

This invention relates to circuit breaker control circuitry, and more particularly to control circuitry that controls the operation of a circuit breaker in such a manner that the circuit breaker contacts always open at a zero load current crossing.

When circuit breaker contacts connecting a load to a power source are opened, an arc is developed across the contacts as the contacts separate. This arcing, no matter how small, has a deleterious effect on the circuit breaker contacts and can become dangerous or hazardous when large currents are involved since the magnitude of the arcing is directly related to the magnitude of the current flowing through the contacts when the contacts are opened.

Since the magnitude of the arcing is directly related to the magnitude of the current flowing through the contacts when the contacts are opened, it is obvious that this arcing can be eliminated if the contacts are opened at a zero load current crossing point. This invention provides control circuitry that assures that the contacts of a circuit breaker always open at a zero load current crossing point. If the contacts of a circuit breaker are opened precisely at a zero load current crossing, no arcing will take place and therefore the contacts of the circuit breaker will not be subjected to the usual deleterious burning and pitting caused by arcing.

SUMMARY OF THE INVENTION

The circuitry of this invention assures that the contacts of a circuit breaker connecting an AC power source to a load will always open at a zero load current crossing. The current is sensed by a current transformer. The output of the current transformer is coupled to circuitry that produces a square wave signal voltage which is in phase with the load current. The square wave signal voltage is then phase shifted such that the square wave leads the load current. After phase shifting, the square wave signal voltage is amplified and then applied to the circuit breaker coil through a solid state switch.

A DC current is applied to the solid state switch through an on-off switch. When the on-off switch is opened, the solid state switch will open at the next zero crossing of the phase shifted square wave signal. The square wave signal is phase shifted to such a degree that the opening time of the circuit breaker contacts plus the phase shift time equals a one-half multiple of the set period of the current. Thus, upon the opening of the solid state switch, the contacts of the circuit breaker will always open at a zero load current crossing.

BRIEF DESCRIPTION OF THE DRAWING

A complete understanding of the objects and details of the invention can be obtained from the following detailed description when read in conjunction with the annexed drawing in which the single FIGURE shows in block diagram form a preferred embodiment of the invention.

DETAILED DESCRIPTION OF THE INVENTION

Referring to the drawing, a load 1 is provided with an AC current from the generator 2 through the contacts of the magnetic circuit breaker 3. Ignoring for the moment the balance of the elements shown in the drawing, opening of the contacts of circuit breaker 3 while current is flowing in the load will cause arcing across the contacts unless by chance the contacts are opened at a zero load current crossing. The balance of the elements shown in the drawing represent this invention and these elements operate in such a manner that the contacts of circuit breaker 3 always open at a zero load current crossing, thereby eliminating contact arcing and the noise and transients associated with such arcing.

The current transformer 4 is coupled in the generator to load power circuit to sense the current flowing to load 1. The output of current transformer 4 is coupled to the input of the multivibrator 5 and the output of multivibrator 5 is coupled to the input of the phase lock loop 6. Phase lock loop 6 may be any suitable known phase lock circuit. For that matter, all the elements shown in the FIGURE are suitable known circuit elements and for this reason are illustrated in block diagram form rather than by specific schemetics. In other words, any known suitable circuit arrangements can be used for the various blocks in the FIGURE.

The output of phase lock loop 6 is a square wave signal voltage that is in phase with the load current. This in-phase square wave signal voltage is applied to the input of the phase shifter 7. Phase shifter 7 provides an adjustable phase shift as is indicated by the adjustable resistor 8. Thus, the output of phase shifter 7 is the square wave voltage signal from phase lock loop 6 shifted in phase by a predetermined amount. Phase shifter 7 shifts the phase of the square wave signal voltage up to a 180° shift with the square wave voltage signal leading the load current.

The phase shifted square wave signal is then applied to the input of the amplifier 9. The output of amplifier 9 is applied to the solid state switch 10. A DC source such as the battery 12 is also coupled to solid state switch 10 through switch 11 and elements 13, 14 and 15. While the battery 12 is shown as the source of DC voltage, it is obvious that this DC voltage could be obtained by the rectification of the AC from generator 2. Battery 12 also supplies a DC voltage to other elements as is indicated in the drawing. Again, this DC power could be provided by means of a rectifier from generator 2.

Switch 11 is a simple on-off switch such as a toggle switch. Elements 13, 14, and 15 are protection devices such as safety switches or the like. For example, device 13 can be an over voltage safety device, device 14 can be an overload safety device, and device 15 can be a short circuit safety device. These devices each operate in such a manner as to open the circuit between battery 12 and solid state switch 10 if the particular fault sensed by that device is present. For example, if device 15 is a short circuit protection device it will open if a short occurs. Devices 13, 14 and 15 are optional devices and are not essential to the basic operation of the circuitry of this invention. However, the inclusion of such safety devices is highly desirable in many cases and such devices would normally, in most cases, be included.

If switch 11 is closed and devices 13, 14 and 15 are closed, battery 12 will supply a DC voltage to solid state switch 10. With this DC voltage applied to solid state switch 10, the amplified and phase shifted square wave signal voltage from amplifier 9 is applied to circuit breaker 3 through solid state switch 10.

If one now wishes to disconnect load 1 from generator 2 by opening the contacts of circuit breaker 3, he merely opens switch 11. Opening switch 11 removes the DC voltage from solid state switch 10 and solid state switch 10 will then open at the next zero crossing of the phase shifted square wave signal voltage. The opening of solid state switch 10, of course, removes the square wave signal voltage from circuit breaker 3 and the circuit breaker will then open. By selecting the proper phase shift for the square wave signal voltage, the contacts of circuit breaker 3 will always open at a zero current crossing of the load current after a zero crossing of the square wave signal voltage when switch 11 is opened.

The necessary shift that must be introduced to the square wave signal voltage is, of course, dependent upon the contact opening time of the contacts of circuit breaker 3. For example, if in terms of degrees for the particular frequency of the load current the contact time is 435° a leading phase shift of 75° to the square wave signal voltage will insure contact opening at a zero crossing of the load current (i.e. 75° phase shift + 360° a zero crossing point = 435°). In other words the phase of the square wave signal voltage must lead the phase of the load current by such an amount that solid state switch 10 will open at the proper time in advance of a zero crossing of the load current to allow the contacts to open at a zero crossing of the load current based on contact opening time. It can be shown mathematically that the phase introduced by phase shifter 7 must be such that the contact opening time plus the phase shift time equals one-half multiple of the set (frequency) period of the load current. Thus, one merely needs to know the contact opening time of the circuit breaker used and the frequency of the load current to compute the adjustment of phase shifter 7, and adjusting phase shifter 7 accordingly will cause the contacts of the circuit breaker to always open at a zero crossing point of the load current when switch 11 is opened.

While the invention has been shown and described with reference to a particular embodiment, it will be apparent to those skilled in the art that various changes and modifications can be made to the specific embodiment shown and described without departing from the spirit and scope of the invention as defined in the claims.

What is claimed is:

1. A control circuit for controlled deenergization of an electromagnetic circuit breaker which interconnects an AC voltage source and a load such that said circuit breaker interconnection contacts open at a zero current point on said source output waveform comprising:

An electromagnetic circuit breaker including coil energization state responsive contact interrupter means, said circuit breaker characterized by a determined time delay between time of deenergization of said contact interruptor means and time of circuit breaker interconnection contacts opening;

sensing means for sensing the waveform of said load current;

signal processing means coupled to the output of said sensing means including means for generating a square wave signal in phase with the waveform of said load current, and means for phase shifting said square wave signal, said phase shifting means adapted to permit shifting of the phase of said square wave signal an amount directly proportional to said predetermined time delay of said contact interrupter means of said circuit breaker;

amplifier means for amplifying the output of said signal processing means, the output of said amplifier means being a square wave signal of selected amplitude;

solid state switching means having a square wave signal conductive path, said switching means including DC voltage responsive trigger means, a DC voltage source, and means for applying said DC voltage source to said trigger means, said means for applying incorporating at least one disconnect means, said switching means adapted to interrupt said signal conductive path thereof at the next zero crossing of the square wave input signal thereto subsequent to disconnect of said DC voltage source from said trigger means, and cascade interconnection means adapted to interconnect said sensing means, said signal processing means, said amplifier means, said square wave signal conductive path of said solid state switching means and said contact interrupter means of said circuit breaker such that the output of said amplifier means energizes said contact interrupter means when said DC voltage source is connected to said trigger means of said switching means and such that energization of said contact interrupter means of said circuit breaker ceases a predetermined time in advance of the next to occur zero current point on said source output waveform when said DC voltage is disconnected from said trigger means of said solid state switching means.

2. A control circuit as defined in claim 1 wherein said means for applying said DC voltage source to said trigger means of said solid state switching means incorporates a series connection of an over voltage protection device, a short circuit protection device and an overload protection device as additional disconnect means operable in similar manner to said at least one disconnect means.

* * * * *